Dec. 22, 1953        C. J. LEISY        2,663,523
AIRCRAFT INTERCONNECTING MECHANISM
Filed Aug. 2, 1949        3 Sheets-Sheet 1
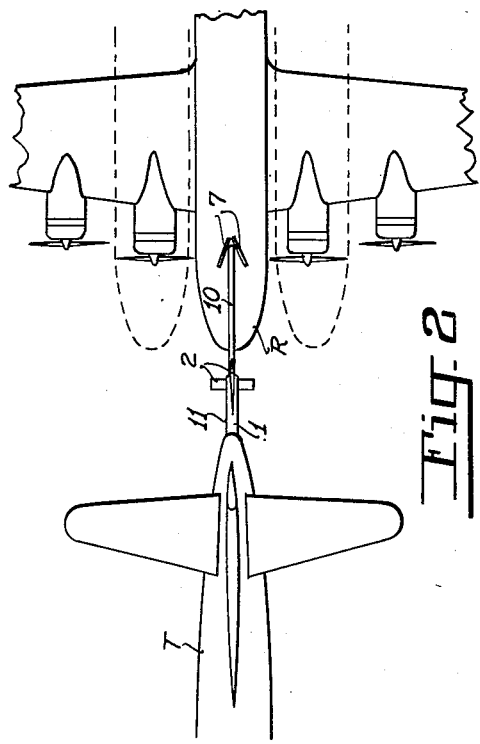
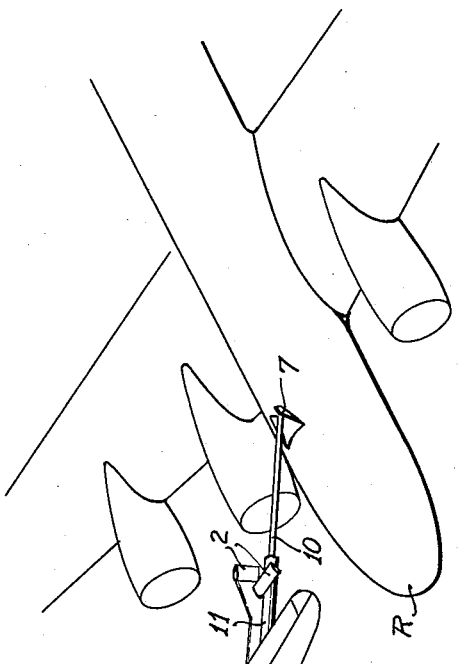
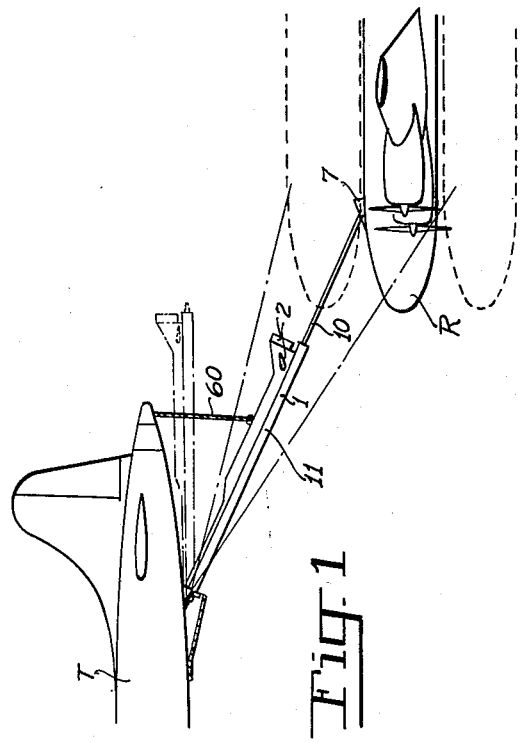
INVENTOR.
CLIFFORD J. LEISY
BY
Reynolds + Beach
ATTORNEYS Dec. 22, 1953     C. J. LEISY     2,663,523
AIRCRAFT INTERCONNECTING MECHANISM
Filed Aug. 2, 1949     3 Sheets-Sheet 2
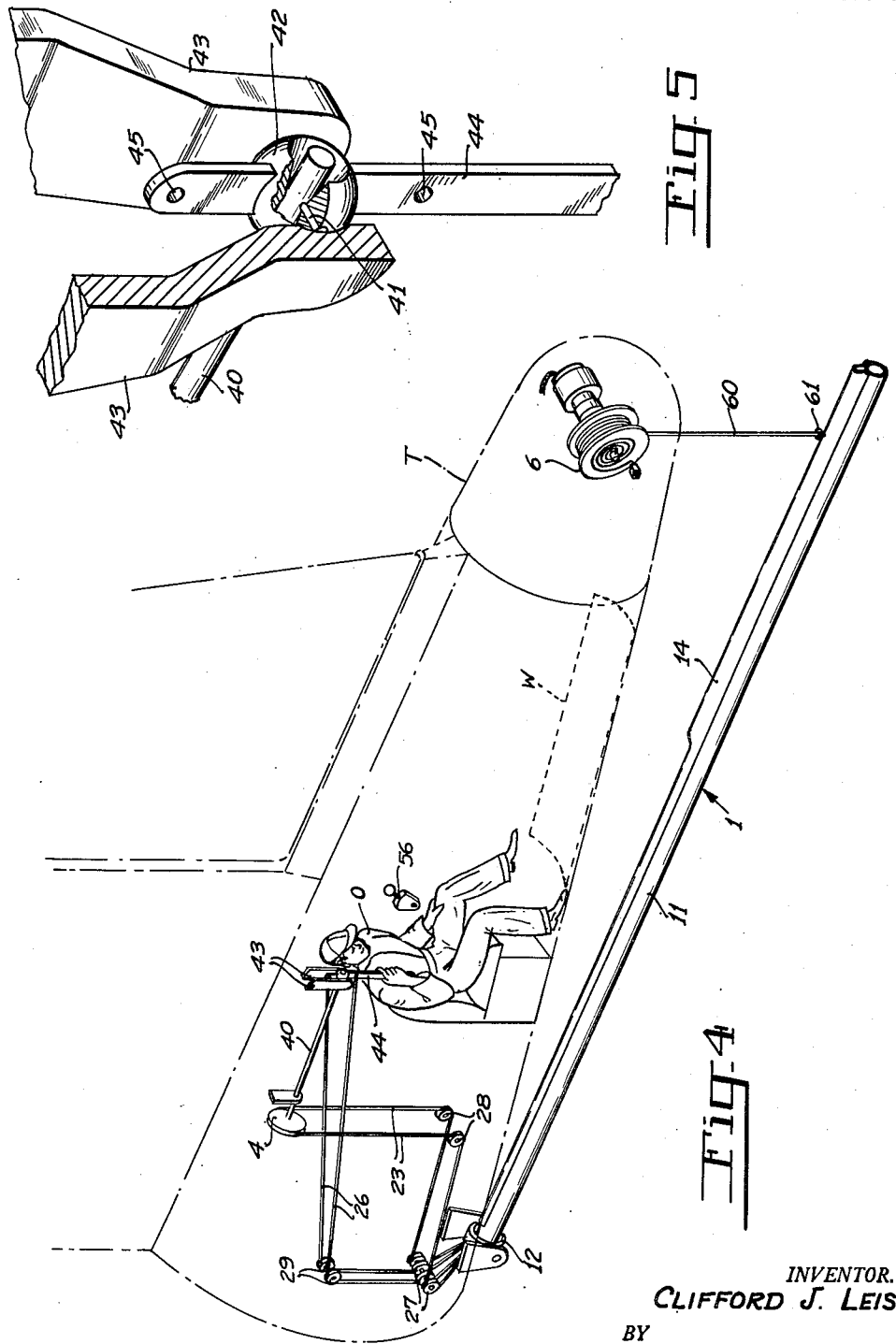
INVENTOR.
CLIFFORD J. LEISY
BY
Reynolds & Beach
ATTORNEYS Dec. 22, 1953 — C. J. LEISY — 2,663,523
AIRCRAFT INTERCONNECTING MECHANISM
Filed Aug. 2, 1949 — 3 Sheets-Sheet 3
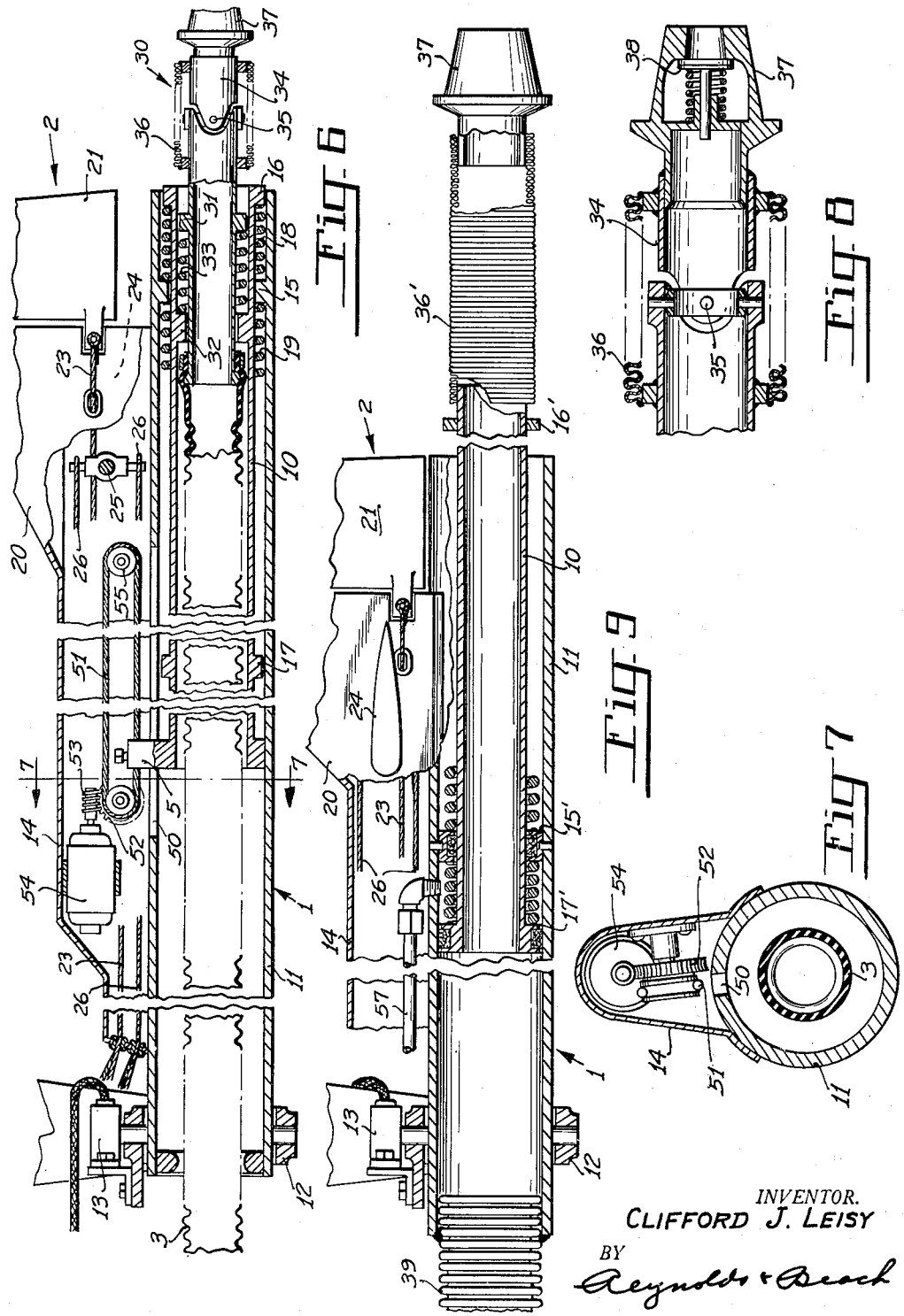
INVENTOR.
CLIFFORD J. LEISY
BY
Reynolds & Beach
ATTORNEYS Patented Dec. 22, 1953

2,663,523

UNITED STATES PATENT OFFICE 2,663,523

AIRCRAFT INTERCONNECTING MECHANISM

Clifford J. Leisy, Seattle, Wash., assignor to Boeing Airplane Company, Seattle, Wash., a corporation of Delaware Application August 2, 1949, Serial No. 108,070

21 Claims. (Cl. 244—135)

This invention relates to apparatus for transferring fuel from one airplane to another while in flight, and incorporates cooperating mechanism on the tanker airplane and on the receiving airplane. While reference will be made herein principally to the use of such apparatus for delivering fuel from one airplane to another, it could be used advantageously for transferring fuel from a lighter-than-air craft to an airplane, and even for transferring fuel from one lighter-than-air craft to another.

A particular advantage of my apparatus is that it may be manipulated by an operator in the tanker airplane without the necessity of exposing any portion of his body to the air stream, and contact may be made with a complemental portion of the apparatus carried by the receiving airplane without the necessity of any crew member in the latter exposing any portion of his body to the air stream.

A further important advantage of the apparatus is the rapidity and facility with which the cooperating parts of the apparatus on the tanker airplane and on the receiving airplane may be brought into contact and connected together to accomplish the refueling operation most expeditiously, which is of great importance particularly for military aircraft because the airplanes are more vulnerable to attack when in refueling relationship because of their close proximity and lack of maneuverability. Another object is to enable the refueling operation to be effected when the airplanes are traveling at high speeds, and because the entire operation of refueling may be carried out relatively quickly, ordinarily it can be accomplished without the receiving airplane departing from the course of its mission, so that no appreciable delay in its flight occurs. The possibility of damage to the receiving airplane is further minimized because of the control over the fuel transferring conduit which is afforded.

More specifically, it is an object of the invention to form the fuel transferring conduit as a telescoping boom supported upon the tanker airplane by one end and swingable universally, so that its trailing end may be shifted quickly fore and aft, to the right or to the left, and up or down as may be necessary to effect connection of its swinging end with the complemental portion of the refueling apparatus carried by the receiver airplane. Appropriate swinging of the boom is controlled by an operator in the tanker airplane, and preferably such manipulation is effected aerodynamically. To facilitate interconnection of the boom and the receiving airplane conduit, preferably the latter is formed as a socket provided with appropriate guide ways for guiding movement of the swinging end of the boom from the vicinity of such socket into proper seating engagement with it.

Additional features of the invention include safety mechanism for controlling the flow of fuel through the boom conduit prior to completion of operating engagement between the complemental parts of the apparatus and subsequent to disconnection of them. Means positively connecting the tanker airplane and a portion of the boom between its ends is operative to limit excessive swinging of the boom and to swing the boom into stored position. The same means may hold the boom in that position at times other than during the refueling operation, and particularly while the tanker airplane is taking off from the airport or landing.

Advantages of particular details of the refueling mechanism, in addition to the general advantages and objects mentioned above, are pointed out in the following particular description of the exemplary form of apparatus shown in the drawings.

Figure 1 is a side elevation view of the stern portion of a tanker airplane and the bow portion of a receiving airplane, showing the boom conduit interconnecting the two airplanes, and illustrating in broken lines permissible variations in altitude of the receiving plane relative to the tanker airplane during the refueling operation.

Figure 2 is a plan view of the stern portion of a tanker airplane and the bow portion of a receiving airplane, showing the boom conduit interconnecting them, and in broken lines showing laterally displaced positions of the receiving airplane relative to the tanker airplane which may be assumed during the refueling operation.

Figure 3 is a top perspective view of the stern portion of a tanker airplane and the bow portion of a receiving airplane with the boom conduit interconnecting the two.

Figure 4 is a top perspective view of the stern portion of a tanker airplane, showing details of the boom supporting and controlling mechanism, and Figure 5 is a fragmentary top perspective view with parts broken away of the control mounting.

Figure 6 is a longitudinal section through the boom, and Figure 7 is a transverse section, showing one type of operating mechanism for effecting boom telescoping, and Figure 8 is a detail longitudinal section view through the nozzle.

Figure 9 is a longitudinal section through a portion of the boom, the remainder being in side elevation.

In refueling operations previous to the advent of my development it has been customary to use a flexible hose draped between the tanker airplane and the receiving airplane. Such hose has been difficult to connect between the tanker and receiving airplane, and even after such connection, while dangling from the tanker airplane, has been largely uncontrollable. Various plans have been proposed for the receiving airplane to contact such a flexible hose, but all of them are rather uncertain and consume considerable time to accomplish.

The present development utilizes a rigid conduit in the form of a boom adjustable in effective length, such as by incorporating a plurality of telescoping rigid tube sections. Such a boom 1, as shown in Figure 1, is attached by its leading end to the tanker airplane T, preferably near its stern, and in fuel transferring position is inclined rearwardly and downwardly from the tanker airplane. To avoid subjecting the boom to large bending loads its position is not controlled by mechanism exerting a force on its anchored end, but instead the position of the boom's trailing end is controlled by air reaction surfaces 2 carried by the boom at a location remote from its anchored end and preferably at or near the trailing end of the boom. The entire directional control of the boom can be effected by such control surfaces, thus enabling the forward end of the boom to be pivoted freely for universal movement.

As shown in Figures 1, 2 and 3, it is desirable for such a boom 1 to be swingable through a sufficient amplitude relative to the tanker airplane, both laterally and vertically, and to be sufficiently adjustable in effective length, so that the tanker airplane T and the receiving airplane R may move relatively through a reasonable range during the refueling operation without placing any strain on the boom mechanism. If these airplanes tend to shift relatively more than allowed by the mounting of the boom's anchored end, the swinging end of such boom will be disconnected automatically from the receiving airplane, so that even in that case no unexpected load will be placed on the fuel transfer mechanism.

When the receiving airplane R moves vertically relative to the tanker airplane T, as shown in Figure 1, the boom 1 must not only be swung through an angle about a horizontal axis, but must be altered in effective length if the fore and aft positions of the airplanes do not change, in order to maintain the connection of the swinging end of boom 1 with the receiving airplane. For that reason the boom is composed of a plurality of telescoping sections, the construction illustrated including an inner tube 10 slidably received within the principal tubular member 11 of the boom. While it would be possible to mount the air reaction control surfaces 2 on the inner tubular boom element 10, it is preferred that they be mounted directly on the principal boom section 11, so that the moment produced by them on the boom will not be altered by changing the effective length of the boom. Similarly, when the receiving aircraft and the tanker aircraft move relatively laterally, as indicated in Figure 2, the effective length of the boom must change if the relative fore and aft locations of the airplanes and their relative elevations are not changed.

To enable the boom to swing in the manner discussed above, the anchored end of its section 11 is carried by a universal joint on the tanker airplane encircling the supported end of the tube 11, as shown best in Figures 6 and 9. The universal joint is of conventional gimbal ring type, so that the supported end of tube 11 is fully open internally for passage of fuel through it or reception of a flexible fuel-carrying conduit 3 received within it and extending therefrom through the tube 10. Potentiometers 13, associated with the pivots of the universal joint 12 disposed in vertical and horizontal planes, respectively, may be appropriately connected to indicators so that a crew member of the tanker airplane may be advised at all times as to the angular disposition of the boom relative to the airplane, both vertically and athwartships of the airplane.

As mentioned previously, it is preferred that no bending load be placed on the boom by attempting to control its swinging by the application of a force to it near or forward of its universal joint mounting 12. The air reaction control surfaces 2 utilized to exert a swinging or deflecting force on the boom are therefore mounted on the boom a substantial distance rearwardly from its anchored end, and preferably as close as possible to the trailing end of the principal boom section 11.

The boom air reaction surfaces 2 may include stationary and swingable empennage surfaces corresponding to those used conventionally on airplanes. Thus they may comprise a vertical fin 20 and a rudder 21 hingedly connected to the trailing edge of the vertical fin, which operate to produce directional stabilizing and control forces. The rudder may be deflected relative to the fin to swing the trailing end of the boom from side to side by manipulation of usual control cables 23 suitably connected to horns on the rudder shown in Figure 9. The vertical location of the boom's swinging end may be controlled and maintained by elevators 24 mounted on a pivot shaft 25 extending through the main boom section 11, and which may be swung by control cables 26 in a manner similar to the movement of elevators on an airplane.

The rudder control cables 23 and the elevator control cables 26 preferably are housed in streamlined cowling 14 extending upward from the tube 11 for the purpose of protecting from the air stream such cables and other operating mechanism to be described. From the forward end of such cowling the control cables extend alongside universal joint 12 into the tanker airplane, and thence to a control station shown in Figure 4.

The rudder control cables 23 and the elevator control cables 26 pass upwardly from tube member 11 around guide pulleys 27 carried by the airplane slightly above the universal joint 12. From these guide pulleys the elevator control cables 23 extend rearwardly around a pair of guide pulleys 28 and thence upwardly about an actuating drum 4 carried by a shaft 40 extending longitudinally of the airplane. Through the end of this shaft remote from wheel 4 extends a crosspin 41 journaled in a spherical mounting member 42, shown in Figure 5. This mounting member is held in sockets formed in the adjacent faces of brackets 43 projecting downward from the roof of the airplane fuselage in generally parallel relationship.

The elevator control cables 26 extend upwardly from the guide pulleys 27 over a pair of guide pulleys 29, and thence rearwardly alongside shaft 40 to locations respectively above and below the mounting ball 42, shown in Figure 5. Integral with this ball element is an upright lever 44 having holes 45 or suitable attachment fittings with which the cables 26 may be connected approximately equal distances above and below the ball 42. The lower end of lever 44 may be formed as a handle, and, as shown in Figure 4, is supported in a location alongside the right shoulder of an operator O by the ball 42 held between brackets 43.

If the operator shifts the lower end of the lever 44 athwartships of the airplane, ball 42 will be rotated in its supporting brackets 43 generally about the axis of shaft 40. Such movement will tilt about the same axis pin 41 anchored in the ball, which in turn will rotate shaft 40, and hence drum 4, to reel in one stretch of cable 23 and correspondingly to pay out the other stretch, which will result in swinging of the boom rudder 21 through an angle corresponding to the displacement of the cable lever 44. Preferably the vertical stretches of cables 23 are crossed prior to passing around drum 4 as shown in Figure 4, so that as the lower end of lever 44 is swung to port, for example, the starboard horizontal stretch of cable 23 will be shortened and the port horizontal stretch will be payed out. Such cable movement will swing the rudder 21 to starboard, resulting in deflection of the trailing end of the boom 1 to port. With the cable 23 thus rigged, movement of the lower end of lever 44 to port will therefore produce deflection of the swinging end of the boom to port, whereas deflection of the lower end of lever 44 to starboard will effect swinging of the boom's trailing end to starboard.

The lever 44 may be swung through a considerable angle fore and aft without hindrance by shaft 40 because there is considerable clearance between such shaft and the aperture in ball 42 through which it passes, as shown in Figure 5. During such movement the ball will simply pivot about pin 41, or such pin will pivot in shaft 40. Movement of the lower end of lever 44 rearwardly will shorten the lower stretch of cable 26 in the fuselage, which corresponds to the upper stretch of the cable within the boom section 11. Such shortening of the upper stretch of cable in the boom, accompanied by corresponding lengthening of the lower stretch, will swing the elevator 24 upwardly to depress the swinging end of the boom. Conversely, as the lower end of the lever 44 is swung forward, the upper stretch of cable 26 in the airplane fuselage, and hence the lower stretch in the boom section 11, will be shortened to tilt the elevator downward, effecting lifting of the trailing end of the boom.

It will be evident that by manipulation of the lever 44 in varying degrees, as described, the boom may be swung upward or downward and sidewise to any extent desired at the will of the operator. Moreover, because of the universal movement of which ball 42 is capable, the handle on the lower end of control lever 44 may be moved universally generally in a horizontal plane to effect any combination of lateral and elevational movement of the boom's trailing end. Indicators connected to the potentiometers 13 associated with the universal joint 12 supporting the anchored end of the boom may be located alongside the operator O to apprise him of the angular disposition of the boom both laterally and vertically. Also, the operator preferably is able to watch the movement of the boom through a window W in the bottom of the fuselage.

It is desirable for the operator of the boom not only to have control over its swinging movement, but also to be able to vary its effective length at will, by moving positively lengthwise the inner tubular element 10 which telescopes within the section 11. Such movement of tube 10 may be effected by a motor drive or by hydraulic piston mechanism. As shown in Figures 6 and 7, a motor drive may shift fore and aft a lug 5 projecting outward through a slot 50 in the wall of tube 11 covered by the fairing 14. This lug is secured to a cable loop 51 which passes around a drive pulley frictionally engaging a worm gear 52 meshing with a worm 53, shown best in Fig. 7. Such worm may be rotated by a suitable reversible motor 54, which may be either electric, hydraulic or air operated. Alternatively the lug 5 may be shifted by a suitable air or hydraulic piston and cylinder arrangement. The end of the cable loop 51 remote from motor 54 passes about a guide pulley 55.

To limit relative lengthwise movement of tubes 10 and 11 and to cushion interruption of such relative movement at limiting positions, tube 11 may have an inwardly projecting shoulder 15 near its trailing end, and tube 10 may have outwardly projecting shoulders spaced apart slightly farther than the total possible change in effective length of the boom, one, 16, at its outer end and another, 17, remote from its outer end. Between shoulders 15 and 16 is lodged a helical compression spring 18 encircling tube 10, and between shoulders 15 and 17 is lodged a helical compression spring 19, also encircling tube 10. These springs are relatively short, and as the innertube 10 approaches its limiting position of inward movement, spring 18 will be engaged by shoulders 16, which will press it against shoulder 15 to cushion and interrupt inward movement of the tube 10. Conversely, as tube 10 nears the limit of its extension movement, shoulder 17 will engage spring 19 and force it against shoulder 15 to cushion and limit outward movement of the tube.

Because of the telescoping nature of the boom, suitable provision must be made for confining within it the liquid fuel. Provision of slot 50 in tube 11 through which lug 5 projects makes it difficult to utilize this tube directly as the fuel passage. Also to avoid the necessity of sealing the joint between tubes 10 and 11, it is preferred to provide a flexible hose 3, such as of corrugated synthetic rubber, to serve as the fuel-carrying conduit. This hose is adjustable in effective length axially through the tubes 11 and 10 as they are moved relatively lengthwise to alter the length of the hollow boom. The rearward end of this hose may be suitably connected to a rigid nozzle 30 received in the trailing end of the inner conduit section 10. Limited longitudinal movement between the nozzle 30 and the tube 10, may be afforded, to absorb the shock on contact of the nozzle with its socket on the receiving airplane, by providing an external annular shoulder 31 on the nozzle and an internal annular shoulder 32 near the trailing end of tube 10, between which shoulders is interposed a helical compression spring 33 received within tube 10 and encircling the nozzle. The hose 3 will exert an inwardly acting force on nozzle 30, which will be yieldingly resisted by spring 33.

The tip portion 34 of the nozzle preferably is secured to the nozzle proper by a crosspin universal joint 35, the details of which construction are shown best in Fig. 8. The fuel passage through the nozzle is sealed about this universal joint by a metallic flexible tube 36 of the corrugated type, the ends of which are bonded to the nozzle body 30 and nozzle tip 34, respectively.

The nozzle tip 34 preferably terminates in the head 37, which is tapered to fit in a suitable socket in receiving airplane R. Also, such tip may house a spring-pressed shut-off valve 38, which may be opened either automatically or voluntarily when the nozzle tip head 37 has been properly engaged in the socket of the receiving airplane.

Alternatively, a single-acting drive mechanism may be employed, merely to move tube 10 into tube 11, and the hydraulic pressure of the liquid fuel within the boom may be relied upon to exert a projecting force on tube 10, as shown in Figure 9. The principal boom section 11 has an inwardly projecting sealing shoulder 15' near its trailing end, provided with a suitable sealing gasket contacting the outer surface of the tube 10. Such latter tube carries an outwardly projecting annular shoulder 17' at its forward end, likewise provided with a sealing gasket engaging the inner surface of tube section 11.

As in the form of device previously described, a helical compression cushioning spring 19 encircling the tube section 10 is interposed between the annular shoulders 15' and 17'. Also, a helical compression spring 18 encircling the inner tube 10 is interposed between the shoulder 15' and a further shoulder 16', projecting outwardly from tube 10 and located near its trailing end.

Because of the sealing gasket in the shoulder 17', the inner fuel-carrying flexible conduit 3 may be omitted, and instead the fuel may pass through a flexible hose section 39, preferably metallic, directly into the forward end of conduit section 11 to which such hose section is connected. From tube section 11 the fuel passes into the inner tube 10, which is connected by a universal joint and flexible tubing section 36 to the nozzle, as previously described, and as shown in Figure 8.

With this type of apparatus it is not necessary to provide double-acting mechanism for shifting tube section 10 relative to tube section 11 to increase the effective length of the boom, because the pressure of the fuel in the conduit, pressing against the interior of the nozzle head closed by valve 38, will exert a force which can be utilized to extend the boom. Such extending movement will be interrupted by engagement of shoulder 17' with spring 19 to press such spring against the shoulder 15'. Retraction of tube 10 may be effected by supplying hydraulic liquid under pressure to the chamber formed between the ribs 15' and 17'. Such hydraulic liquid will be confined between these ribs by their gaskets. The pressure of such liquid reacting against rib 15' will press on rib 17' to shift tube 10 to the left in Figure 9, thereby retracting it to any desired extent into the tube 11.

Whatever type of drive mechanism is selected, it may be controlled by a control handle 56, shown in Figure 4 as disposed adjacent to the left hand of the operator O. As this handle is shifted rearwardly the inner tube 10 may be extended, and as the handle is pulled forward the tube 10 may be retracted into tube 11. Such handle would control the motor 54 in the mechanism shown in Figures 6 and 7. Where mechanism like that shown in Figure 9 is employed, the handle may be utilized to control the flow of liquid through conduit 57, either for the purpose of supplying liquid to effect retraction of tube 10, or to release such liquid so that the pressure of the fuel within the boom can force shoulder 17' toward shoulder 15' to extend the boom and at the same time to force hydraulic liquid from the chamber 19 back to the conduit 57 to a reservoir of the hydraulic liquid pressure source (not shown).

In order to enable the extensible boom to be moved quickly and positively into stored position and to hold it in such position, a winch 6, shown in Figure 4, may be provided in the extreme tail of the tanker airplane T, which controls a cable 60. This cable is attached to a point on the boom section 11 located directly under the winch, by any suitable fitting such as the eye 61. This eye is located sufficiently far rearwardly of the universal joint 12 as to enable substantial leverage about the boom's pivot to be exerted on the boom, but the trailing end of the boom should not project rearward so far beyond the eye 61 as to produce an objectionable bending stress in the boom when the cable 60 is tensioned.

In a typical refueling operation the receiving airplane R will be maneuvered into a position slightly behind and somewhat below the tail of the tanker airplane T, while the latter is held on a steady course. When the operator O sees the receiving airplane in approximately the correct position, viewed through his window W, for contact by the flying boom, he will release the winch 6 so that the cable 60 will run free, allowing the trailing end of the boom 1 to swing downward and to be controlled by the air reaction surfaces 2. The operator will then move lever 44 laterally and fore and aft as necessary to move the rudder 21 and elevators 24, respectively, for swinging the trailing end of the boom to align it with the boom socket in the receiving airplane.

When the receiving airplane has assumed approximately its correct position with respect to the tanker airplane T for refueling and such formation has been reasonably stabilized, the operator will manipulate boom extension control handle 56 as necessary to project the inner section 10 of the boom rearwardly from the outer section until contact is made with the receiving airplane. As shown best in Figure 3, preferably the receiving airplane has converging guide plates 7 disposed at opposite sides of the socket for guiding contact by the head 37 of the flying boom, and the operator O will control the rudder 21 and elevators 26 while varying the effective length of the boom to slide the head 37 of the boom along the surface of the fuselage of the receiving airplane between the plates 7 until the boom head has been lodged in its socket.

When the head 37 of the flying boom has been fitted into its socket on the receiving airplane, suitable latch means may be provided to secure the head in such position, or at least to hold it against minor forces tending to displace it, and valve 38 may be shifted to open position either by the coupling operation or subsequent to it.

After the tanker airplane and the receiving airplane have thus been interconnected for refueling, lever 44 should be released by the operator O so that the rudder 21 and the elevators 24 may feather into alignment with the air stream, irrespective of relative vertical or lateral movement of the airplanes. They will therefore not exert any force on the boom during the refueling operation which would produce any stress in it or tend to dislodge the head 37 of the boom from its socket. Also, motor 54 or the hydraulic boom retracting mechanism of Figure 9 should be capable of being driven by the boom, or suitable clutching mechanism should be provided, to enable the boom to be lengthened or shortened by forces produced on it by the two airplanes without appreciable resistance by the extension control mechanism, as the relative positions of the airplanes vary.

Upon completion of the refueling operation the latch mechanism holding the head 37 to the receiving airplane may be released, or the receiving airplane may be maneuvered to produce a latch releasing force upon the boom. Thereupon the valve 38 will be closed automatically by its spring, and the operator will move the handle 56 to operate the motor 54, or to supply liquid under pressure to the conduit 57, to effect full retraction of tube section 10 into tube section 11. The winch 6 will then be operated to reel in cable 60 which will hoist the boom into stored position close beneath the tail of the tanker airplane during its return flight, as shown in broken lines in Figure 1.

I claim as my invention:

1. In combination, a tanker airplane and refueling mechanism for transferring fuel from such tanker airplane to a receiving airplane, said refueling mechanism comprising a longitudinally stiff tubular boom, means carried by said tanker airplane and supporting the forward portion of said tubular boom for disposition of said boom in trailing attitude and capable of universal swinging movement within limits, and means operatively connected to said boom and operable from within the tanker airplane to effect swinging of said boom for contact of the trailing end thereof with the receiving airplane.

2. In combination, a tanker airplane and refueling mechanism for transferring fuel from such tanker airplane to a receiving airplane in flight, said refueling mechanism comprising a boom composed of a plurality of telescoping tubular sections, universal joint means carried by said tanker airplane and swingably supporting the forward end of the outer tubular section to dispose said boom in trailing attitude, empennage control surfaces carried by the rearward end of said outer tubular boom section, control means located within said tanker airplane operatively connected to said control surfaces and movable to adjust said surfaces to effect swinging of said boom about said universal joint means, and means controllable from within said tanker airplane and operable to project an inner tubular member of said boom rearwardly beyond said outer tubular member thereof.

3. Mechanism for transferring fluid from a supply aircraft to a receiving aircraft in flight, comprising a hollow boom, a nozzle, universal joint means connecting said nozzle to one end of said boom and apertured for flow of fluid therethrough, and flexible tubing encircling said universal joint means and secured to said nozzle and to the adjacent end of said boom to form a continuous passage therebetween.

4. In combination, an aircraft and mechanism for interconnecting said aircraft with another aircraft while in flight, said mechanism comprising a boom, means supporting said boom from said aircraft in trailing attitude for swinging relative to such aircraft, air reaction control surfaces carried by said boom, control means carried by said aircraft and operable to effect swinging of said control surfaces by movement relative to said aircraft, and actuating means operatively connected to said control means and operative to move said control means relative to said aircraft.

5. In combination, a tanker airplane and refueling mechanism for transferring fuel from such tanker airplane to a receiving airplane, comprising a tubular boom, means swingably supporting said boom from said tanker airplane in trailing attitude, air reaction control surfaces carried by said boom, control means in said tanker airplane operatively connected to said air reaction control surfaces and movable relative to said tanker airplane to adjust said air reaction control surfaces for effecting swinging of said boom by such movement relative to said tanker airplane, and actuating means operable to move said control means relative to said tanker airplane.

6. Transfer mechanism for transferring material from a supply aircraft to a receiving aircraft in flight, comprising a longitudinally stiff, hollow boom, variable in effective length, a flexible liner conduit extending through said boom for flow of fluid therethrough and variable in effective length, and means adjacent to the respective ends of said boom, secured to correspondingly located portions of said liner conduit and operable to vary the effective length of said liner conduit in response to change in length of said boom.

7. Mechanism for transferring material from a supply aircraft to a receiving aircraft in flight, comprising a boom including an outer tube and an inner tube received in said outer tube and slidable lengthwise thereof, means operable to shift said inner tube lengthwise relative to said outer tube to vary the effective length of the boom, flexible conduit means extending through said outer and inner tubes forming a unitary conduit throughout the length of the boom lengthwise contractible and extensible, and means securing one portion of said flexible conduit means to said outer tube and another portion of said flexible conduit means, spaced remotely from such first portion of said flexible conduit means, to said inner tube to affect alteration of the effective length of said flexible conduit means corresponding to the variation in the effective length of the boom.

8. In combination, an aircraft and mechanism for interconnecting said aircraft with another aircraft while in flight, said mechanism comprising a boom, air reaction control surfaces mounted on said boom forward of its after end, universal joint means carried by said aircraft and swingably supporting said boom in position trailing from said aircraft, and means operatively connected to said air reaction control surfaces and movable to adjust such surfaces relative to said boom for effecting swinging of said boom.

9. In combination, an aircraft and mechanism for interconnecting said aircraft with another aircraft while in flight, said mechanism comprising a boom, air reaction control surfaces mounted on said boom forward of its after end, universal joint means carried by said aircraft and swingably supporting said boom in position trailing from said aircraft, means operatively connected to said air reaction control surfaces and movable to adjust such surfaces relative to said boom for effecting swinging of said boom, the after end of said boom being adjustable toward and away from said air reaction control surfaces, and means controllable from within said aircraft and operable to shift the after end of said boom toward and away from said air reaction control surfaces for interconnection with such other aircraft.

10. The combination defined in claim 9, in which the boom includes an outer tube on which the air reaction control surfaces are mounted and an inner tube telescoping within and projectable behind said outer tube, the universal joint means swingably supporting one end of said outer tube from the aircraft.

11. In combination, a first aircraft and mechanism for interconnecting said first aircraft with another aircraft while in flight, said mechanism comprising a boom adjustable in effective length and having an aft end engageable with such other aircraft, universal joint means carried by said first aircraft, connected to the forward portion of said boom and swingably supporting said boom in position trailing from said first aircraft; control means independent of such other aircraft extending from said first aircraft past said universal joint means adjacent thereto and along said boom but stopping short of the aft end thereof and operable to effect universal swinging of said boom relative to said first aircraft, and means controllable from within said first aircraft and operable to adjust the effective length of said boom for interconnection with such other aircraft.

12. The combination defined in claim 11, in which the boom includes an outer tube and an inner member telescoping within said outer tube, the universal joint means swingably supporting one end of said outer tube from the first aircraft, and the control means stopping short of the aft end of said outer tube.

13. In combination, a first aircraft and mechanism for interconnecting said first aircraft with another aircraft while in flight, said mechanism comprising a boom having an aft end engageable with such other aircraft, universal joint means carried by said first aircraft, connected to the forward portion of said boom and swingably supporting said boom in position trailing from said first aircraft, and control means independent of such other aircraft extending from said first aircraft past said universal joint means adjacent thereto and along said boom but stopping short of the aft end thereof and operable to effect universal swinging of said boom relative to said first aircraft.

14. The combination defined in claim 13, and air reaction control surfaces independent of such other aircraft and carried by the boom at a location forward of its aft end, the control means being operatively connected to said air reaction control surfaces, and movable to adjust such surfaces relative to the boom for effecting universal swinging of the boom.

15. In combination, an aircraft and mechanism for interconnecting said aircraft with another aircraft while in flight, said mechanism comprising a telescoping boom including an outer tube and an inner member, universal joint means carried by said aircraft and swingably supporting one end of the outer tube of said boom, air reaction control surfaces mounted on the other end of the outer tube of said boom, and means operatively connected to said air reaction control surfaces and movable from within said aircraft to adjust said surfaces for effecting universal swinging of said boom.

16. In combination, an aircraft and mechanism for interconnecting said aircraft with another aircraft while in flight, said mechanism comprising a telescoping boom including an outer tube and an inner member, universal joint means carried by said aircraft and swingably supporting one end of the outer tube of said boom, air reaction control surfaces mounted on the other end of the outer tube of said boom, means operatively connected to said air reaction control surfaces and movable from within said aircraft to adjust said surfaces for effecting universal swinging of said boom, and means operable to project said inner member rearwardly from said outer tube.

17. Mechanism for interconnecting aircraft in flight, comprising a boom adapted to be mounted on an aircraft and including an outer tube and an inner member received in said outer tube and slidable lengthwise thereof, means operatively connected to said inner member and operable to slide it lengthwise of said outer tube, resilient means carried by said outer tube and received within it, and abutments carried by said inner member exteriorly thereof and adjacent to opposite ends thereof, respectively, engageable with said resilient means in extreme extended and extreme retracted positions of said inner member relative to said outer tube, respectively, to cushion movement of said inner member as it approaches its extreme positions of movement relative to said outer tube.

18. In combination, an aircraft and mechanism for interconnecting said aircraft with another aircraft while in flight, said mechanism comprising a boom, means carried by the under side of said aircraft forward of its rearward end and swingably supporting said boom from said aircraft to dispose said boom in downward and rearward trailing attitude, and hoisting means carried by said aircraft at a location rearwardly of said supporting means and bridging between such location and a portion of said boom outside the aircraft and rearwardly of and remote from said supporting means, and operable to swing the rearward end of said boom upwardly to dispose said boom in stored position close beneath and generally parallel to the lower surface of such aircraft.

19. The combination defined in claim 18, in which the aircraft is an airplane and the hoisting means includes a winch housed within the airplane fuselage, and a cable extending through the fuselage wall end depending from substantially the extreme aft end of the fuselage and interconnecting the boom and said winch.

20. The combination defined in claim 18, in which the boom includes an outer tube and an inner tube telescoping within said outer tube and projectable rearwardly therefrom to adjust the effective length of the boom, the hoisting means being connected to said outer tube.

21. Mechanism for interconnecting aircraft in flight comprising a boom adapted to be mounted on an aircraft and having an aft end engageable with another aircraft, air reaction control surfaces carried by said boom at a location forward of its aft end and projecting from opposite sides of said boom, and pivot means supporting from said boom the end of each of said air reaction control surfaces adjacent to said boom for pivoting of each air reaction control surface about an axis extending spanwise of the respective air reaction control surface.

CLIFFORD J. LEISY.

(References on following page)

References Cited in the file of this patent

UNITED STATES PATENTS

| Number | Name | Date |
|---|---|---|
| 1,544,032 | Potez | June 30, 1925 |
| 1,728,449 | Procofieff et al. | Sept. 17, 1929 |
| 1,729,354 | Mounce | Sept. 24, 1929 |
| 1,806,834 | Ullendorff | May 26, 1931 |
| 1,818,834 | Zimmerman | Aug. 11, 1931 |
| 1,848,372 | Moran | Mar. 8, 1932 |
| 2,334,323 | Gilbert | Nov. 16, 1943 |
| 2,385,392 | Van Dusen | Sept. 25, 1945 |
| 2,402,283 | Hewitt | June 18, 1946 |
| 2,433,473 | Mitchell | Dec. 30, 1947 |

FOREIGN PATENTS

| Number | Country | Date |
|---|---|---|
| 346,181 | Great Britain | Apr. 9, 1931 |